(12) United States Patent
Michenet et al.

(10) Patent No.: US 9,096,092 B2
(45) Date of Patent: Aug. 4, 2015

(54) METHOD OF AND APPARATUS FOR PERSONALISING A SERIES OF PORTABLE OBJECTS

(75) Inventors: Sébastien Michenet, Saint Denis de l'Hotel (FR); Benoit Berthe, Orleans (FR); Uwe Jaspers, Minnetonka, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 0 days.

(21) Appl. No.: 13/811,728

(22) PCT Filed: Jul. 23, 2010

(86) PCT No.: PCT/IB2010/002186
§ 371 (c)(1), (2), (4) Date: Jan. 23, 2013

(87) PCT Pub. No.: WO2012/010924
PCT Pub. Date: Jan. 26, 2012

(65) Prior Publication Data
US 2013/0120515 A1    May 16, 2013

(51) Int. Cl.
| | |
|---|---|
| *B41J 2/435* | (2006.01) |
| *B42D 25/41* | (2014.01) |
| *B23K 26/067* | (2006.01) |
| *B23K 26/08* | (2014.01) |
| *B23K 26/12* | (2014.01) |
| *B41J 3/60* | (2006.01) |
| *B41J 13/12* | (2006.01) |
| *G07F 17/42* | (2006.01) |
| *B42D 25/00* | (2014.01) |
| *B41J 2/44* | (2006.01) |

(52) U.S. Cl.
CPC ............ *B42D 25/41* (2014.10); *B23K 26/0673* (2013.01); *B23K 26/0807* (2013.01); *B23K 26/0838* (2013.01); *B23K 26/127* (2013.01); *B41J 3/60* (2013.01); *B41J 13/12* (2013.01); *B42D 25/00* (2014.10); *G07F 17/42* (2013.01); *B41J 2/435* (2013.01); *B41J 2/442* (2013.01); *B42D 2035/50* (2013.01)

(58) Field of Classification Search
USPC .................................. 347/224, 225, 233, 243
See application file for complete search history.

(56) References Cited

U.S. PATENT DOCUMENTS

| | | | |
|---|---|---|---|
| 5,521,628 A * | 5/1996 | Montgomery | 347/243 |
| 7,329,830 B2 * | 2/2008 | Baudron et al. | 219/121.68 |

FOREIGN PATENT DOCUMENTS

| | | |
|---|---|---|
| DE | 10 2006 052527 | 5/2007 |
| EP | 1705600 | 9/2006 |
| WO | 95/06563 | 3/1995 |
| WO | 2007/104854 | 9/2007 |

OTHER PUBLICATIONS

International Search Report for international application No. PCT/IB2010/002186, dated Apr. 29, 2011 (2 pages).

* cited by examiner

*Primary Examiner* — Huan Tran
(74) *Attorney, Agent, or Firm* — Hamre, Schumann, Mueller & Larson, P.C.

(57) ABSTRACT

Embodiments of the invention provide a method of and apparatus for graphically marking a series of portable objects, such as a card, each portable object being graphically marked on a respective zone by a respective marking device, wherein the marking devices are configured to perform the same marking operation simultaneously on a plurality of portable objects.

14 Claims, 8 Drawing Sheets

| Step | | Marking Station 4 | Marking Station 5 | |
|---|---|---|---|---|
| 1 | Va | C1 | | |
| | Vb | | | |
| 2 | Va | C1 | | |
| | Vb | C2 | | |
| 3 | Va | C3 | C1 | |
| | Vb | C2 | | |
| 4 | Va | C3 | C1 | |
| | Vb | C4 | C2 | |
| 5 | Va | C5 | C3 | C1 |
| | Vb | C4 | C2 | |
| 6 | Va | C5 | C3 | C1 |
| | Vb | C6 | C4 | C2 |
| 7 | Va | C7 | C5 | C3 |
| | Vb | C6 | C4 | C2 |
| 8 | Va | C7 | C5 | C3 |
| | Vb | C8 | C6 | C4 |
| 9 | Va | C9 | C7 | C5 |
| | Vb | C8 | C6 | C4 |
| 10 | Va | C9 | C7 | C5 |
| | Vb | C10 | C8 | C6 |
| 11 | Va | C11 | C9 | C7 |
| | Vb | C10 | C8 | C6 |
| 12 | Va | C11 | C9 | C7 |
| | Vb | C12 | C10 | C8 |
| 13 | Va | C13 | C11 | C9 |
| | Vb | C12 | C10 | C8 |

METHOD OF AND APPARATUS FOR PERSONALISING A SERIES OF PORTABLE OBJECTS

FIELD OF THE INVENTION

The present invention relates in general to a method and apparatus for personalising a series of portable objects such as cards with or without a chip. A potential application of an embodiment of the invention is in the graphical personalisation of a series of cards.

BACKGROUND OF THE INVENTION

Systems for personalising portable objects such as smart cards including SIM cards, credit cards or telephone cards, as well as electronic purses and the like are known. In a card personalisation system several personalisation operations can be carried out to customise the card to the user. The personalisation operations may include processes for graphical personalisation of the card by relief marking of the card by embossing or stamping, printing on one or both surfaces of the card, laser marking the card, etc as well as processes for electronic personalisation of the card by transferring data to and from a memory of the card. Some processes may include a step for verifying the cards at the end of the personalisation process. Typically, the personalisation processes are carried out sequentially on a series of cards which are fed to a personalisation machine.

A personalisation operation for graphically marking the cards typically uses a marking device such as a laser marking machine to mark graphical data on the card. The graphical data may for example include text such as the name of the bearer of the card, a serial number or code, a bar code, a photograph, an image or a drawing or other patterns or codes on the cards. A laser marking machine, for example, generally includes a marking element such as a laser transmitter, a marking location for placing a card to be marked opposite the marking element, a transfer path to supply the card to be marked to the marking location and to remove the cards already marked from the marking location.

A personalisation operation for electronic customisation of a card provided with a programmable smart object such as a chip typically involves transferring electronic data from a database to a smart object which is accessible via one of the surfaces of the card. The card may be provided with a plurality of smart objects accessible for programming by opposing sides of the card, or a smart object accessible by both sides of the card. In such a case the card may need to be flipped over so that the communication device transferring the electronic personalisation data can interface with one side of the card, and then the other.

In order to graphically mark both sides of the card, a graphical personalisation process is repeated so that the card can be turned over, often manually, and the opposite the side of the card graphically marked.

In sequential laser marking machines multiple of cards are fed sequentially through a machine and processed sequentially. In some sequential laser marking machines the laser marking machine is provided with two separate laser marking stations each providing a marking pattern on a different surface of the card being processed. In this way and each card passing through the machine passes through both laser marking machines. While one card is being marked by the first laser marking machine a second card may be marked by the second laser marking machine before the first card is then fed to the second marking machine for the second marking process. This system enables a plurality of cards to be marked by two marking stations simultaneously leading to an increase in the throughput of processed cards. However, the processing times for the respective laser marking machines can be uneven which leads to lost processing time while one laser station having finished its graphical personalisation procedure awaits the second laser station to finish its graphical personalisation procedure which takes longer.

The present invention has been devised with the foregoing drawbacks in mind.

BACKGROUND OF THE INVENTION

In its most general form the invention provides a method of and apparatus for graphically marking a series of portable objects, each portable object being graphically marked on a respective zone by a respective marking device, wherein the marking devices are configured to perform the same marking operation simultaneously on a plurality of portable objects.

Accordingly, a first aspect of the invention provides a method of graphically marking a series of portable objects, each portable object being graphically marked by a plurality of graphical marking procedures, the method comprising: receiving a first portable object at a first graphical marking station for graphical marking of a first zone of the first portable object by a first graphical marking means of the first graphical marking station; receiving a second portable object at a second graphical marking station for graphical marking of a first zone of the second portable object by a second graphical marking means of the second graphical marking station; graphically marking a first marking layout on the first zone of the first portable object by means of the first graphical marking means and simultaneously graphically marking the same first marking layout on the first zone of the second portable object by means of the second graphical marking means; transferring the first portable object to the second graphical marking station for graphical marking of a second zone of the first portable object by the second graphical marking means, wherein the second zone is different to the first zone; receiving a further portable object at the first graphical marking station for graphical marking of a second zone of the further portable object, by the first graphical marking means of the first graphical marking station; graphically marking a second marking layout on the second zone of the first portable object by means of the second graphical marking means, wherein the second marking layout is different to the first marking layout, and simultaneously graphically marking the same second marking layout on the second zone of the further portable object by means of the first graphical marking means. The further portable object may be subsequently transferred to the second graphical marking station for graphical marking of a first zone of the further portable object, by the second graphical marking means with the first graphical marking layout if so required.

A second aspect of the invention provides a graphical marking apparatus for graphically marking a series of portable objects by a plurality of graphical marking procedures carried out sequentially on each of the plurality of portable objects, each portable object having a first zone to be marked with a first graphical marking layout and a second different zone to be marked with a second different graphical marking layout, the apparatus comprising: a first marking station comprising first graphical marking means operable to graphically mark the first graphical marking layout or, alternatively, the second graphical marking layout on a portable object of the series of portable objects; and a marking location for receiving the portable object to be marked; a second marking station comprising second graphical marking means operable to graphically mark the first graphical marking layout or, alternatively the second graphical marking layout on a portable object; and a marking location for receiving the portable object to be marked; a transfer device for transferring a portable object from the first marking station to the second marking station; wherein the first marking station is operable to graphically mark the first graphical marking layout on the first zone of a portable object, of the series of portable objects, when said portable object is located at the marking location; and to graphically mark the second graphical marking layout on the second zone of a further portable object of the series of portable objects when said further portable object is located at the marking location; wherein the second marking station is operable to graphically mark the second graphical marking layout on the second zone of the said portable object of the series of portable objects when said portable object is located at the marking location; and to graphically mark the first graphical marking layout on the first zone of the said further portable object of the series of portable objects when the said further portable object is located at the marking location; and wherein the first marking station and the second marking station are configured to simultaneously graphically mark the first graphical marking layout on a respective portable object, and to simultaneously graphically mark the second graphical marking layout on a respective portable object.

It will be appreciated that the first zone of the second object may or may not correspond to the first zone of the first object. The objects may receive the same marking layout on the same zone or on different zones.

In embodiments of the invention:
the first zone of the corresponding portable object corresponds to at least a portion of a first surface of the said portable object and the second zone corresponds to at least a portion of a second opposing surface of the said portable object, the method further comprising or the apparatus further comprising means for flipping the said portable object after a first surface has been graphically marked by the first graphical marking means so that the second surface can be graphically marked by the second graphical marking means.

the first graphical marking station and the second graphical marking station may each be provided with a first marking location and a second distinct marking location;

the method may further comprise or the apparatus may further comprise means for receiving a portable object from the series of portable objects at the first marking location; directing the first graphical marking means to the first marking location; graphically marking the said portable object at the first marking location while simultaneously receiving another portable object, from the series of portable objects, at the second marking location; redirecting the first graphical marking means to the second marking location; and graphically marking the other portable object at the second marking location while simultaneously replacing the said portable object at the first marking location with a further portable object from the series of portable objects.

the same graphical marking layout may be performed at the first and subsequently at the second marking location the first marking station may graphically mark at least two sequential portable objects with the first marking layout on the first zone of the respective portable object before graphically marking at least two further sequential portable objects with the second marking layout on the second zone of the respective portable objects.

the first marking station may graphically mark four sequential portable objects with the first marking layout on the first zone of the respective portable object before graphically marking four further sequential portable objects with the second marking layout on the second zone of the respective portable objects.

the graphical marking means may include a laser and the directing means comprises optical means for enabling the beam from the laser to be deflected alternately on to one or other of the marking locations.

each marking location may be provided with a corresponding transfer path in the marking station for transferring a portable object to the corresponding marking location.

At least parts of the methods according to the invention may be computer implemented. The methods may be implemented in software on a programmable apparatus. They may also be implemented solely in hardware or in software, or in a combination thereof.

Since at least parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

A system and method for processing a series of portable objects according to a first embodiment of the invention will be described with reference to FIGS. 1 to 4. In this embodiment of the invention, by way of example, the method is implemented to graphically mark both sides of a number of SIM (subscriber identity module) cards. It will be appreciated however that methods of the invention may be applied to graphically mark other portable objects such as cards with or without a chip, including credit cards or telephone cards, as well as electronic purses and passport booklets and the like. Although the treated objects mentioned above are in the area of identification documents, embodiments of the invention can be applied to other work-pieces requiring various processing procedures to be applied.

Several potential applications of the invention are connected with personalized cards primarily ID1 formatted and containing an electronic storage device a SIM card is representatively explained as a potential object of application.

Figure 1:
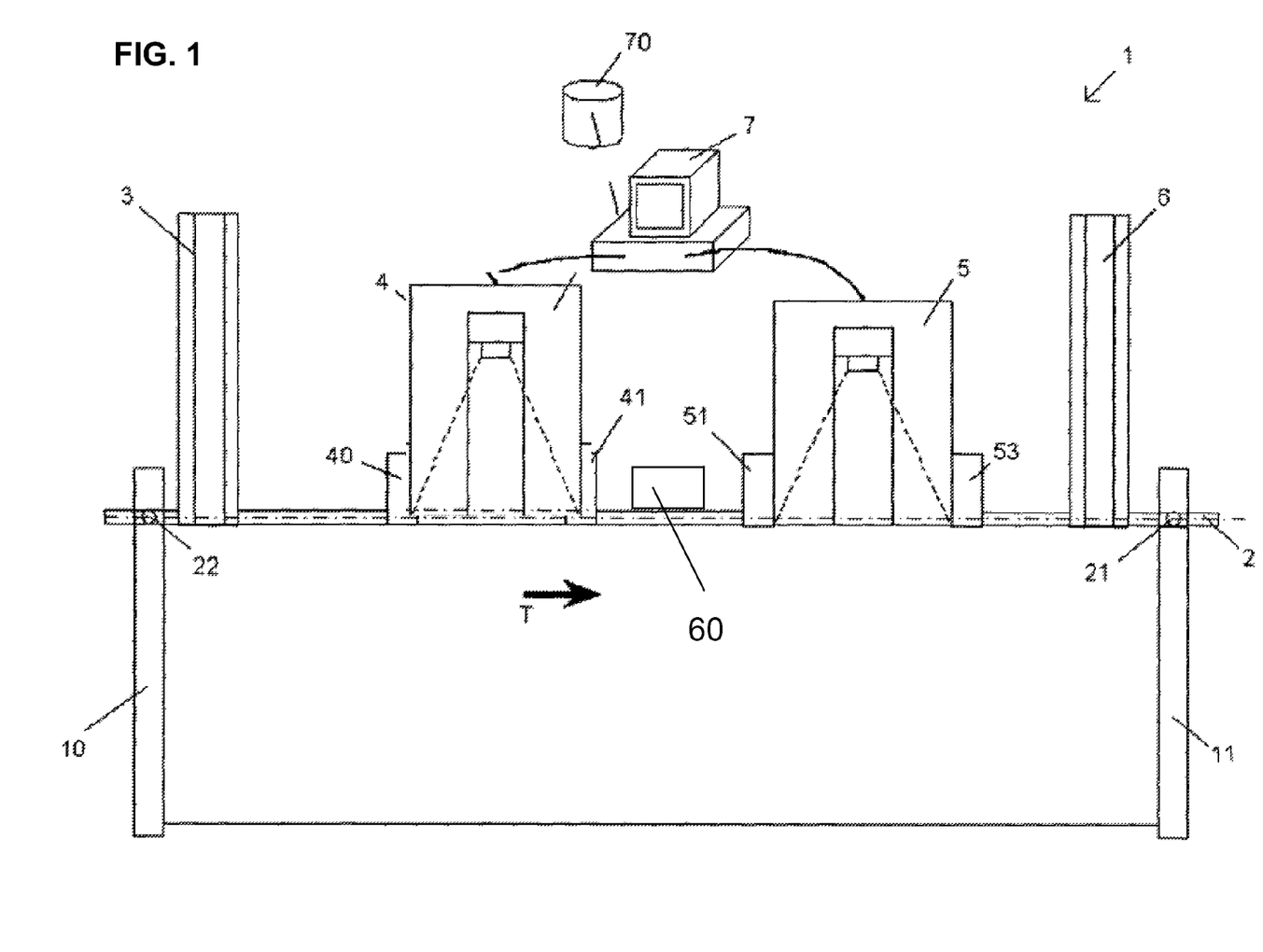
FIG. 1 is a schematic view of a card personalisation machine in accordance with an embodiment of the present invention.

With reference to FIG. 1, a personalisation machine 1 for personalising the SIM cards according to a first embodiment of the invention includes a processing bench 10 on top of which is mounted a horizontal transfer path 2 formed of a conveyor belt circulating between two end pulleys 21, 22. At least one of the end pulleys is driven by a motor. The conveyor belt is used to transfer a plurality of cards from one processing station to another. The personalisation machine 1 includes a first graphical marking station 4 and a second graphical marking station 5. The personalisation machine 1 further comprises an unstacking device 3 which unstacks cards one at a time from a batch of stacked cards and places them one by one on the conveyor belt 2 to be transferred to the processing stations.

The cards C thus introduced to the transfer path 2 are supplied to the first graphical marking station 4 for marking of a first surface of the card. A loading device 40 introduces the cards C to be personalised to the graphical marking station 4 and an unloading device 41 unloads the cards C one by one from the graphical marking station 4. Once graphically marked by the first graphical marking station 4 the cards C are supplied one by one via the transfer path of the conveyor belt towards the marking station 5 for a further graphical marking procedure.

The further graphical marking procedure may be performed on the same surface of the card as the first graphical marking procedure, on a different surface zone of the same surface. In some embodiments of the invention the further graphical marking procedure is performed on the opposing surface of the card to the surface where the first graphical marking procedure was performed. In this case the card is flipped over so that the second surface of the card is placed facing towards the laser marking device of the second graphical marking station. In the embodiment of FIG. 1 the cards may be flipped over by flip over device 60 before arriving at the second marking station 5 so that a surface opposing the surface marked by the first marking station may then be graphically marked by the second marking station. The flip over device may any mechanical or electrically operated flip over device known to the skilled person in the art that can operate to flip over a card so that first surface of the card is turned from facing in one direction through an angle of approximately 180° to facing in a second opposite direction, and the second surface of the card, opposing the first surface is turned from facing in the second opposite direction through an angle of approximately 180° to facing in the first direction. Typically such a device includes a unit to perform the flip over process, turning the card through an angle of approximately 180° n and a card holder, such as a pincer device, to hold the card during the flip over process. This permits one surface of the card to be processed by the first marking station and the second opposing surface of the card to be processed by the second marking station.

After the cards C have been graphically marked by the second graphical marking station 5 they are then transported by the conveyor belt 2 to a stacking device 6 where they are stacked in a magazine. In some embodiments of the invention the cards C may be transferred from the second graphical marking station 4, to a further processing station (not shown) for electronic personalisation of the card for example or to a verification station which verifies the personalisation of the card and/or manages preparation of the cards for mailing. In other embodiments of the invention the cards may be transferred to one or more further graphical marking stations.

An information system 7, such as a computer, is linked to the graphical marking devices 4 and 5. This information system 7 may include or be linked to a database 70 comprising personalisation data and marking data for the cards to be personalised. The information system 7 transmits the marking data to the respective graphical marking station 4 or 5, for the graphical marking procedure performed on the card to be marked.

Figure 2A:
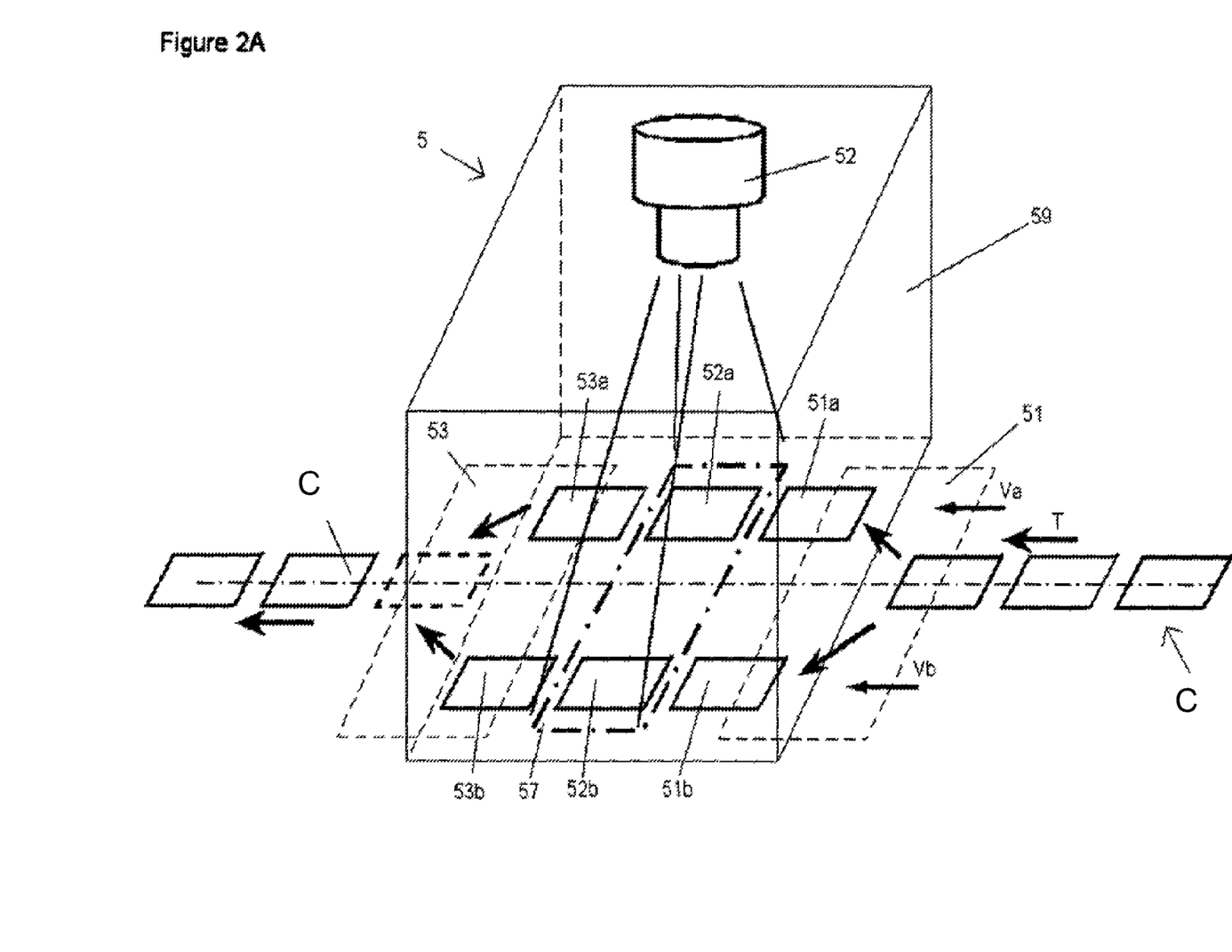
FIG. 2A is an illustrative perspective view of a marking station according to a first embodiment of the present invention.

A first embodiment of a laser marking station of each of graphical marking stations 4 and 5, will be described with reference to FIG. 2A.

The marking machine (5) in general comprises at least one laser chamber (59) comprising at least two marking locations (52a, 52b) for receiving cards to be marked, at least one laser marking means (52) housed in the laser chamber (59) which is radiation sealed for protection against laser radiation from the laser marking means (52). The laser marking means (52) produces a laser beam having an axis of symmetry projected perpendicularly relative to the marking locations (52a, 52b) on which the cards are received horizontally. A loading device (51) loads cards into the chamber, each card C being fed alternately to marking locations (52a, 52b) via one of two intra-chamber transfer paths (Va, Vb) arranged parallel to one another and also parallel to the transfer path T. One transfer path (Va) transfers a portion of the cards C to marking location 52a and the other transfer path (Vb) transfers another portion of the cards C to marking location 52b. An unloading device (53) unloads the cards C from the two paths back (Va, Vb) to the transfer path T. In accordance with a possible embodiment, the intra-chamber transfer paths (Va, Vb) of the intra-chamber transfer path of the marking machine (5) may be each formed by a continuous latched belt circulating in between two end pulleys whereof at least one is driven by a motor controlled by the control system of the personalisation machine.

Each intra-chamber path (Va, Vb) comprises at least three locations (51a, 52a, 53a; 51b, 52b, 53b) also known as transfer steps: an inlet location (51a, 51b) for placing the card (8) to be marked from the transfer path T of the personalisation machine (1), at least one marking location (52a, 52b) of the card C where the card is marked by the laser means (52) and one outlet location (53a, 53b) from where the card C is removed from the marking machine (5).

The marking machine (5) comprises at least two distinct marking locations (52a, 52b) for cards C, a first marking location (52a) situated on the first intra-chamber path (Va) and a second marking location (52b) situated on the second intra-chamber path (Vb). These two locations (52a, 52b) are incorporated into a chamber for protection from laser beams delimited around the scanning field (57) of the laser. The loading device (51) comprises a divergence manipulator element passing the smart cards C to be marked from the single-path transfer path T of the personalisation machine (1) to one of the double-path intra-chamber transfer paths (Va, Vb) of the marking machine (5). In the same way, the unloading device (53) comprises a convergence manipulator element passing the marked cards from the double-path intra-chamber transfer path (Va, Vb) of the marking machine to the single-path transfer path (2) of the marking machine (5).

Figure 2B:
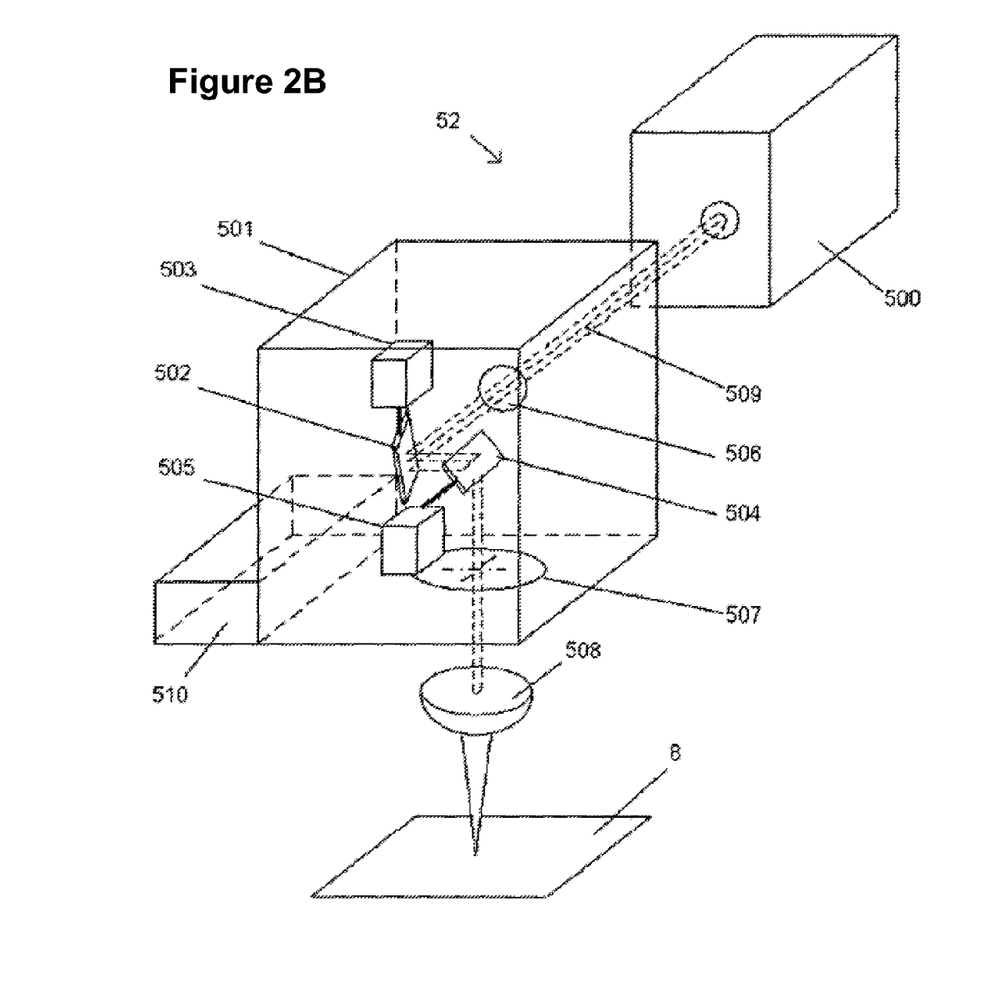
FIG. 2B illustrates an embodiment of a laser means of a marking station in accordance with an embodiment of the present invention.

With reference to FIG. 2B, the laser means (52) comprises optical means including a laser element (500) for producing a laser beam, a deflection element (501) of the laser beam to direct it alternatively to one of the two marking locations (52a, 52b) and a refining element (508) of the laser beam. The deflection element (501) of the laser beam comprises two inclinable mirrors (502, 504) each held and actuated by an activating mechanism (503, 505), the planes formed by each mirror (502, 504) being arranged perpendicularly to one another. A first mirror (502) is placed inclined opposite the inlet opening (506) of the deflection element and receives the laser beam (509) emitted by the laser element (500). The first mirror (502) is activated in rotation according to a vertical axis by a first action mechanism (503) horizontally deflecting the laser beam (509) projected, the first mirror (502) reflecting this laser beam (509) onto the second mirror (504). The second mirror (504) is placed inclined opposite the outlet opening (507) of the deflection element and receives the laser beam (509) reflected onto the first mirror (502). The second mirror (504) is placed in rotation according to a horizontal axis by the second action mechanism (505) effectively vertically deflecting the laser beam (509) reflected to the outlet opening (507) of the deflection element. The first and the second action mechanism (503, 505) are arranged in the deflection element and each comprises a control motor. On exiting from the deflection element the output laser beam will be refined by the refining element (508) which can be a converging lens and will then be projected onto one of the two marking locations (52a, 52b) following the inclination of the two mirrors. In one embodiment, the action mechanisms (503, 505) of the vertical or horizontal inclination of the two mirrors (502, 504) are controlled by a galvanometric device controlled by the information system (7) of the personalisation machine. For each card to be engraved, the information system (7) recovers in its database (70) the data to be engraved on the card and generates orientation data which is sent to the galvanometric device controlling the rotation mechanisms (503, 505) of the mirrors (502, 504) deflecting the laser beam (509). The deflection element (501) deflects the laser beam (509) during marking of the data on the support of a card C present on one of the two marking locations (52a, 52b) and during shifting of the laser beam (509) to one or the other of the two marking locations (52a, 52b). During shifting of the laser beam to one of the two marking locations (52a, 52b) the information system (7) controls the interruption of the emission of the laser beam.

The deflection element (501) of the laser beam (509) and the refining element (508) of the laser beam (509) can enlarge the laser marking field which can thus cover for example a field of 180 mm by 180 mm comprising four marking locations. Further details of the marking station may be found in European patent application EP 1705600 which is incorporated herein in its entirety, by reference thereto.

A general marking cycle for graphically marking a series of cards in each of the graphical marking stations, according an embodiment the present invention, is presented as follows. A first card is moved from inlet location (51a) to a first marking location (52a) and the laser is drawn to this location (52a) to mark the card. During this time a second card is moved from inlet location (51b) to the second marking location (52b). At the end of the marking of the first card, the deflection element (501) of the laser redirects the laser beam (509) to the second marking location (52b) where the second card to be marked is placed. During marking of the second card at marking location (52b), the first marked card is moved from the marking location (52a) to the outlet location 53a and is simultaneously replaced at the marking location (52a) by a third card to be marked.

Figure 3:
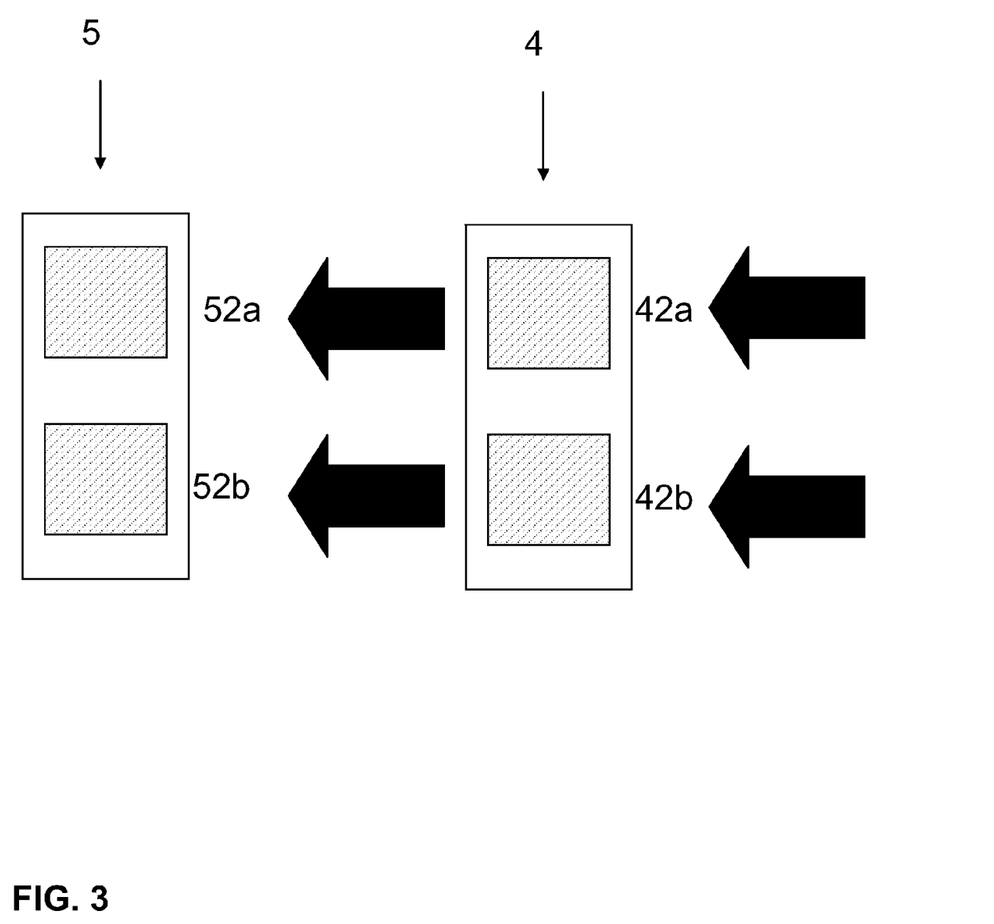
FIG. 3 is a partial schematic view showing the marking locations of the first and second marking stations according to an embodiment of the invention.
Figure 4:
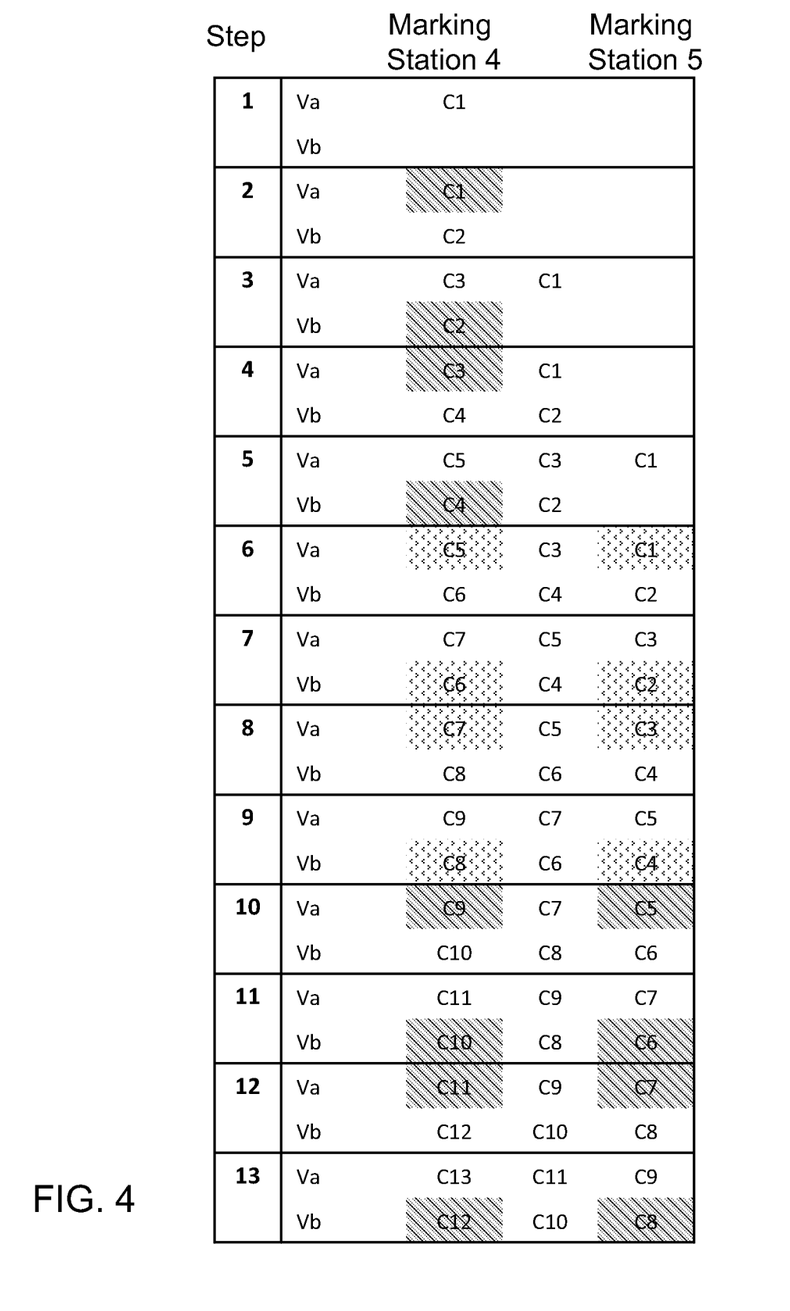
FIG. 4 illustrates the steps of a method of graphically marking a series of cards according to an embodiment of the invention.

A general marking cycle involving the two graphical marking stations 4 and 5 as illustrated in FIG. 1 will now be described with reference to FIGS. 3 and 4. FIG. 3 is a partial schematic view showing the marking locations 42a and 42b of the first laser marking station 4 and the marking locations 52a and 52b of the second laser marking station 5 of the card personalisation machine. Each of marking stations 4 and 5 operates according to the marking station of the first embodiment illustrated in FIG. 2A. Each marking station is configured to graphical mark two graphical marking patterns. By graphical marking pattern is meant any graphical markings including text, numbers, images, As illustrated in FIG. 4 at a first phase (Step 1) of the card marking procedure according to an embodiment of the invention, a first card C1 is received via the first intra chamber path Va of the first marking station 4 at the first marking location 42a. In a second phase (Step 2) the first card C1 is graphically marked by deflecting the laser beam of laser 52 by means of deflection element 501 to marking location 42a. The card C1 is graphically marked with a first graphical marking pattern A. Meanwhile, during the second phase a second card C2 is received via the second intra chamber path Vb of the first marking station 4 at the second marking location 42b.

In a third phase (step 3) the second card C2 is graphically marked by deflecting the laser beam of laser 52 by means of deflection element 501 to second marking location 42b. The second card C2 is graphically marked with the first graphical marking pattern A. Meanwhile, a third card C3 is received via the first intra chamber path Va of the first marking station 4 at the first marking location 42a. The first card C1 is transferred from the first marking station 4 towards the second marking station 5. Before reaching the second marking station 5, the first card C1, can be flipped over by an angle of 180° at a flip over station placed between the first and second marking station, if appropriate, so that the opposing face of the first card C1 may be graphically marked by the second laser station 5.

In a fourth phase (Step 4) the third card C3 positioned at the first marking location 42a is graphically marked with the first graphical marking pattern A by deflecting the laser beam of laser 52 by means of deflection element 501 to first marking location 42a. Meanwhile, a fourth card C4 is received via the second intra chamber path Vb of the first marking station 4 at the second marking location 42b. At the same time, before reaching the second marking station 5, the second card C2 is flipped over by an angle of 180° so that the opposing face of the second card C2 may be graphically marked by the second laser station 5.

In a fifth phase (Step 5), the first card C1 is received via the first intra chamber path Va of the second marking station 5 at the first marking location 52a. The fourth card C4 positioned at the second marking location 42b of the first marking station 4 is graphically marked with the first graphical marking pattern A by deflecting the laser beam of laser 52 by means of deflection element 501 to the second marking location 42b. Meanwhile, a fifth card C5 is received via the first intra chamber path Va of the first marking station 4 at the first marking location 42a. The third card C3 is transferred from the first station 4 towards the second station 5. Before reaching the second marking station 5, the third card C3 is flipped over by an angle of 180° so that the opposing face of the third card C3 may be graphically marked by the second laser station 5.

In a sixth phase (Step 6), the first card C1 positioned at the first marking location 52a of the second marking station 5 is graphically marked on its opposing surface with a second graphical marking pattern B, different to the first marking pattern A, by deflecting the laser beam of laser 52 by means of deflection element 501 to the first marking location 52a. Simultaneously, the fifth card C5 positioned at the first marking location 42a of the first marking station 4 is graphically marked with the second graphical marking pattern B by deflecting the laser beam of laser 52 by means of deflection element 501 to the first marking location 42a. Meanwhile, a sixth card C6 is received via the second intra chamber path Vb of the first marking station 4 at the second marking location 42b. The fourth card C4 is transferred from the first station 4 towards the second station 5. Before reaching the second marking station 5, the fourth card C4 is flipped over by an angle of 180° so that the opposing face of the fourth card C4 may be graphically marked by the second laser station 5. The second card C2 is transferred via the second intra chamber path Vb of the second marking station to the second marking location 52b of the second marking station 5.

Since the first laser station and the second laser station simultaneously engrave cards C5 and C1 with the same marking pattern the procedural time for marking the two cards is the same therefore leading to a higher rate of processing since no time is wasted while one station waits for the other station to finish its particular marking pattern.

In a seventh phase of the process (step S7) the second card C2 positioned at the second marking location 52b of the second marking station 5 is graphically marked on its opposing surface with the second graphical marking pattern B, by deflecting the laser beam of laser 52 of the second marking station 5 by means of deflection element 501 to the second marking location 52b. Simultaneously, the sixth card C6 positioned at the second marking location 42b of the first marking station 4 is graphically marked with the second graphical marking pattern B by deflecting the laser beam of laser 52, of the first marking station 4, by means of deflection element 501 to the second marking location 42b. Meanwhile, a seventh card C7 is received via the first intra chamber path Va of the first marking station 4 at the first marking location 42a. The fifth card C5 is transferred from the first station 4 towards the second station 5. Before reaching the second marking station 5, the fifth card C5 is flipped over by an angle of 180° so that the opposing face of the fifth card C5 may be graphically marked by the second laser station 5. The third card C3 is transferred via the first intra chamber path Va of the second marking station to the first marking location 52a of the second marking station 5.

In an eighth phase (Step 8), the third card C3 positioned at the first marking location 52a of the second marking station 5 is graphically marked on its opposing surface with the second graphical marking pattern B, by deflecting the laser beam of laser 52 of the second marking station by means of deflection element 501 to the first marking location 52a. Simultaneously, the seventh card C7 positioned at the first marking location 42a of the first marking station 4 is graphically marked with the second graphical marking pattern B by deflecting the laser beam of laser 52, of the first marking station 4, by means of deflection element 501 to the first marking location 42a. Meanwhile, an eighth card C8 is received via the second intra chamber path Vb of the first marking station 4 at the second marking location 42b. The sixth card C6 is transferred from the first station 4 towards the second station 5. Before reaching the second marking station 5, the sixth card C6 is flipped over by an angle of 180° so that the opposing face of the sixth card C6 may be graphically marked by the second laser station 5. The fourth card C4 is transferred via the second intra chamber path Vb of the second marking station to the second marking location 52b of the second marking station 5.

In a ninth phase of the process (step S9) the fourth card C4 positioned at the second marking location 52b of the second marking station 5 is graphically marked on its opposing surface with the second graphical marking pattern B, by deflecting the laser beam of laser 52 of the second marking station 5 by means of deflection element 501 to the second marking location 52b. Simultaneously, the eighth card C8 positioned at the second marking location 42b of the first marking station 4 is graphically marked with the second graphical marking pattern B by deflecting the laser beam of laser 52, of the first marking station 4, by means of deflection element 501 to the second marking location 42b. Meanwhile, a ninth card C9 is received via the first intra chamber path Va of the first marking station 4 at the first marking location 42a. The seventh card C7 is transferred from the first station 4 towards the second station 5. Before reaching the second marking station 5, the seventh card C7 is flipped over by an angle of 180° so that the opposing face of the seventh card C7 may be graphically marked by the second laser station 5. The fifth card C5 is transferred via the first intra chamber path Va of the second marking station to the first marking location 52a of the second marking station 5.

In a tenth phase (Step 10), the fifth card C5 positioned at the first marking location 52a of the second marking station 5 is graphically marked on its opposing surface with the first graphical marking pattern A, by deflecting the laser beam of laser 52 of the second marking station by means of deflection element 501 to the first marking location 52a. Simultaneously, the ninth card C9 positioned at the first marking location 42a of the first marking station 4 is graphically marked with the first graphical marking pattern A by deflecting the laser beam of laser 52, of the first marking station 4, by means of deflection element 501 to the first marking location 42a. Meanwhile, a tenth card C10 is received via the second intra chamber path Vb of the first marking station 4 at the second marking location 42b. The eighth card C8 is transferred from the first station 4 towards the second station 5. Before reaching the second marking station 5, the eighth card C8 is flipped over by an angle of 180° so that the opposing face of the eighth card C8 may be graphically marked by the second laser station 5. The sixth card C6 is transferred via the second intra chamber path Vb of the second marking station to the second marking location 52b of the second marking station 5.

In an eleventh phase of the process (step S11) the sixth card C6 positioned at the second marking location 52b of the second marking station 5 is graphically marked on its opposing surface with the first graphical marking pattern A, by deflecting the laser beam of laser 52 of the second marking station 5 by means of deflection element 501 to the second marking location 52b. Simultaneously, the tenth card C10 positioned at the second marking location 42b of the first marking station 4 is graphically marked with the first graphical marking pattern A by deflecting the laser beam of laser 52, of the first marking station 4, by means of deflection element 501 to the second marking location 42b. Meanwhile, an eleventh card C11 is received via the first intra chamber path Va of the first marking station 4 at the first marking location 42a. The ninth card C9 is transferred from the first station 4 towards the second station 5. Before reaching the second marking station 5, the ninth card C9 is flipped over by an angle of 180° so that the opposing face of the ninth card C9 may be graphically marked by the second laser station 5. The seventh card C7 is transferred via the first intra chamber path Va of the second marking station to the first marking location 52a of the second marking station 5.

In a twelfth phase (Step 12), the seventh card C7 positioned at the first marking location 52a of the second marking station 5 is graphically marked on its opposing surface with the first graphical marking pattern A, by deflecting the laser beam of laser 52 of the second marking station by means of deflection element 501 to the first marking location 52a. Simultaneously, the eleventh card C11 positioned at the first marking location 42a of the first marking station 4 is graphically marked with the first graphical marking pattern A by deflecting the laser beam of laser 52, of the first marking station 4, by means of deflection element 501 to the first marking location 42a. Meanwhile, a twelfth card C12 is received via the second intra chamber path Vb of the first marking station 4 at the second marking location 42b. The tenth card C10 is transferred from the first station 4 towards the second station 5. Before reaching the second marking station 5, the tenth card C10 is flipped over by an angle of 180° so that the opposing face of the tenth card C10 may be graphically marked by the second laser station 5. The eighth card C8 is transferred via the second intra chamber path Vb of the second marking station to the second marking location 52b of the second marking station 5.

In a thirteenth phase of the process (step S13) the eighth card C8 positioned at the second marking location 52b of the second marking station 5 is graphically marked on its opposing surface with the first graphical marking pattern A, by deflecting the laser beam of laser 52 of the second marking station 5 by means of deflection element 501 to the second marking location 52b. Simultaneously, the twelfth card C12 positioned at the second marking location 42b of the first marking station 4 is graphically marked with the first graphical marking pattern A by deflecting the laser beam of laser 52, of the first marking station 4, by means of deflection element 501 to the second marking location 42b. Meanwhile, a thirteenth card C13 is received via the first intra chamber path Va of the first marking station 4 at the first marking location 42a. The eleventh card C11 is transferred from the first station 4 towards the second station 5. Before reaching the second marking station 5, the eleventh card C11 is flipped over by an angle of 180° so that the opposing face of the eleventh card C11 may be graphically marked by the second laser station 5. The ninth card C9 is transferred via the first intra chamber path Va of the second marking station to the first marking location 52a of the second marking station 5.

The marking process of the series of cards C1 to Cn can continue in this way until each of the cards Ci is graphically marked. At each engraving stage the same pattern in engraved simultaneously by the corresponding laser of the first and second station on the corresponding cards. In this way each card Ci receives a graphical marking pattern A on one surface of the card and a graphical marking pattern B on an opposing surface of the card Ci.

It will be appreciated that in some embodiments of the invention the flip over stage may be omitted, and the second laser station may perform an engraving procedure on a different zone on the same side of the card as the engraving procedure performed by the first marking station.

It will also be appreciated that in embodiments of the invention the card personalisation system may include two or more graphical marking stations.

Figure 5:
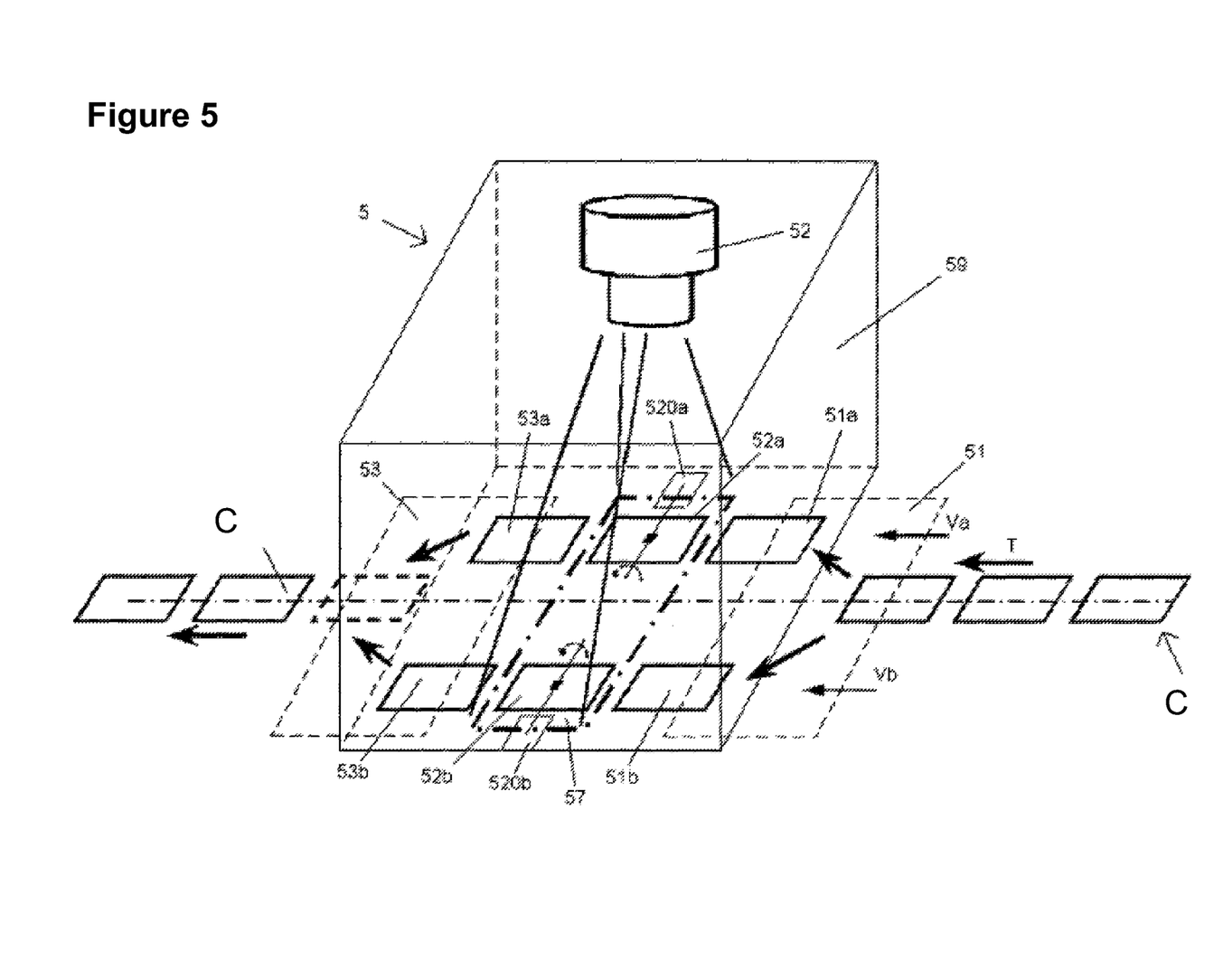
FIG. 5 illustrates an illustrative perspective view of an alternative embodiment of a marking station according to the present invention.
Figure 6:
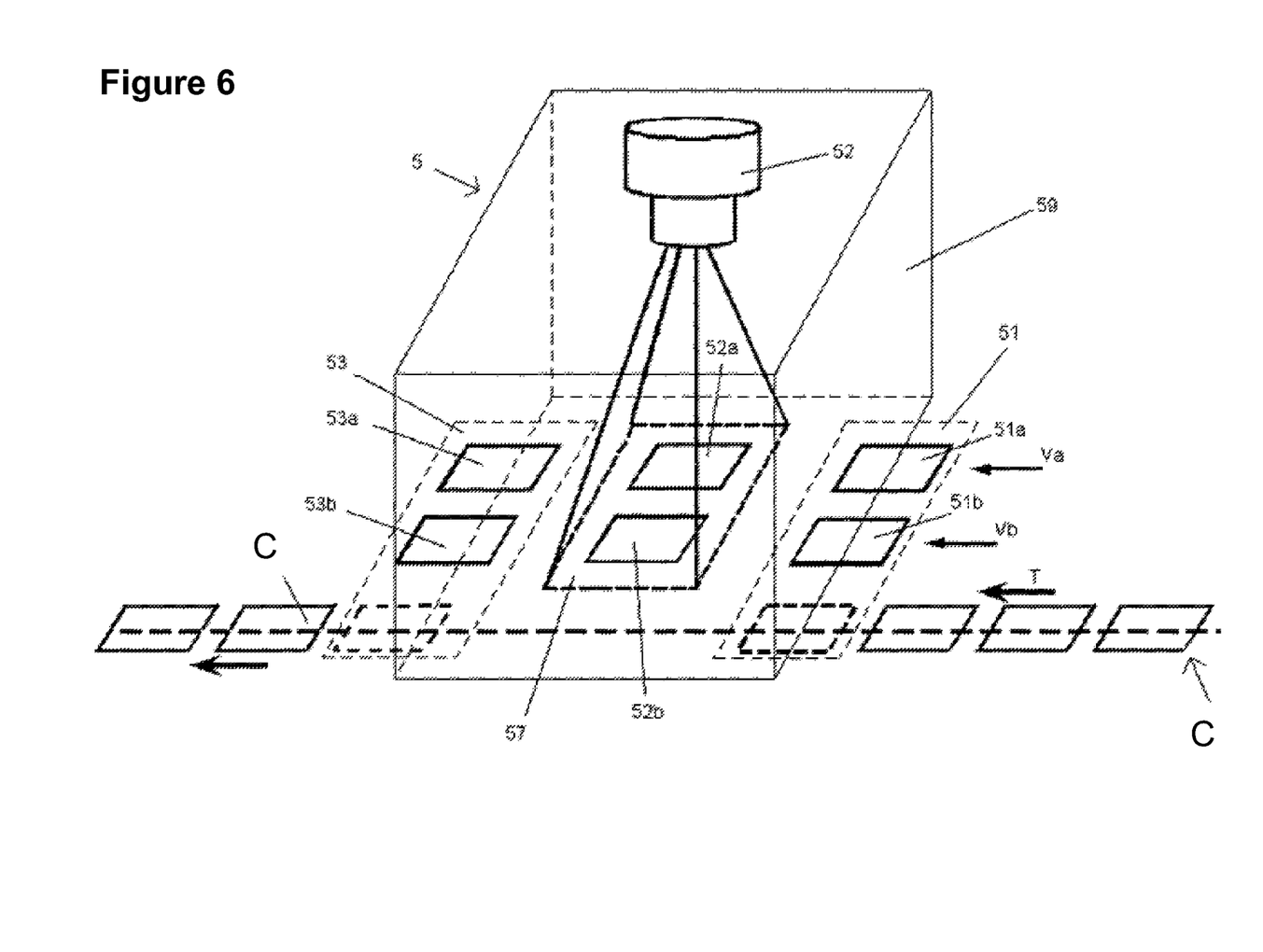
FIG. 6 illustrates an illustrative perspective view of yet a further embodiment of a marking machine according to the present invention, allowing the precision of the laser to be increased by reducing the marking field.
Figure 7:
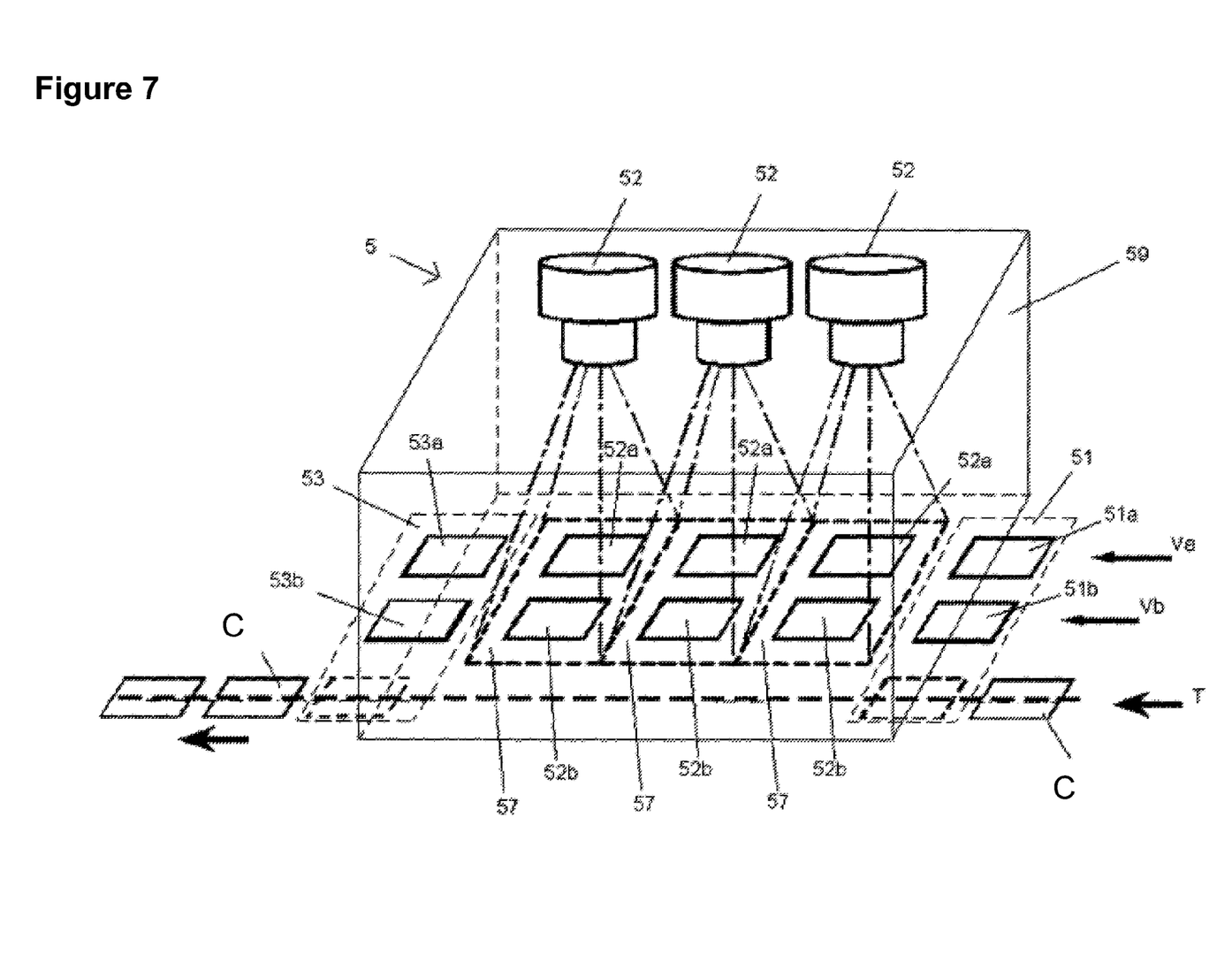
FIG. 7 illustrates a perspective view of another embodiment of a marking machine according to the present invention comprising several lasers.

Variant embodiments of graphical marking station which may be used as graphical marking stations in the context of the invention are illustrated in FIGS. 5 to 7. FIG. 5 illustrates a marking station enabling either of the two faces (recto and verso) of the cards to be graphically marked. The marking machine (5) is similar to the marking machine of the preceding embodiment and further comprises on each intra-chamber transfer path a return element (520a, 520b) at a respective marking location (52a, 52b) for flipping over a card located at the respective marking location so that the card may be graphically marked on each face in the same marking station. In accordance with a variant embodiment, the marking machine (5) can comprise four marking locations, two marking locations being aligned on each transfer path of the marking machine, the return element being arranged between each marking station and returning a card from a first marking location to a second marking location of the same intra-chamber path.

FIG. 6 illustrates an example of another embodiment of the present invention, in which the two transfer paths (Va, Vb) are situated on the same side of the transfer path (2). This embodiment reduces the size of the field (57) to be scanned by the laser beam (509) to cover the marking locations (52a, 52b). The laser means (52) can thus be closer to the marking locations and the precision of the laser is improved. In this embodiment, the loading (51) and unloading devices (53) could comprise divergence manipulator arms or a belt (or similar transporting system to move the cards and, respectively, convergence manipulator arms or belt transport like system (not shown) to load and, respectively, unload the cards (8). To improve the rate of the machine, two manipulator arms could be provided for each of the loading (51) and unloading devices (53). As in the preceding embodiments, in this embodiment return elements (520a, 520b) could be provided for returning the cards in the marking locations (52a, 52b).

FIG. 7 represents another embodiment of a marking machine for marking supports as plastic cards, according to the present invention. This variant embodiment is particularly well adapted for marking cards whereof the marking time by the laser is long. In fact, in the case of a long marking time, for example several seconds, it is possible to load/unload more than a single card during marking of a card by the laser. The solution proposed by this variant embodiment of the invention consists of augmenting the number of cards to be loaded at the same time on an intra-chamber transfer path (Va, Vb) and thus augment the number of lasers (52) working at the same time to mark the cards of this path (Va, Vb) during the loading/unloading of the cards of the other path (Vb, Va). In the example of FIG. 7, three lasers (52) can at the same time mark the cards loaded on three marking locations (52a, 52b) of the same intra-chamber transfer path (Va, Vb) while the unloading device (53) evacuates the three cards already marked by the three lasers of the other intra-chamber transfer path and while the loading device (51) supplies three fresh cards to be marked. For reasons of precision of the laser due to the size of the scanning field (57) in the chamber, the example of FIG. 7 shows a variant in which the three marking locations of the same path (Va, Vb) are close to one another and are included in the same laser chamber (59), but it is evident that the invention separates the marking locations into different laser chambers (59) or at least into different laser protection chambers delimited by the scanning fields (57) of the lasers (52). It is also evident that the number of lasers (52) utilised at the same time depends on the time necessary to mark a card and thus on the time available to load a certain number of cards. The invention thus provides marking machines (5) comprising several lasers (52) though whereof only a certain number is utilised at the same time because of the marking time which does not allow loading/unloading of the cards on the locations (52a, 52b) of all the lasers (52). It is understood that this variant embodiment of the invention provides a marking machine (5) whereof the limiting laser marking time is utilised to optimise production owing to marking of several cards at the same time, as far as optionally rendering the loading/unloading time to be the limiting time. Therefore, the invention could be optimised permanently to utilise as many lasers as the other elements of the production chain would permit. Also, FIG. 7 shows the invention with only three lasers (52) and these are arranged in series along the transfer paths (Va, Vb) of a single chamber (59), but it is evident that the invention can combine several embodiments. For example, a machine (5) comprising two laser chambers (59) each situated, for example, to one side of the transfer path (2) and each comprising 3 lasers (52), for example arranged as in FIG. 7, at the same time marks 6 cards in a transfer path (Va, Vb) of the two chambers (59), during loading/unloading of 6 cards on the other path (Vb, Va) because of two loading devices (51) and two unloading devices (53) operating at the same time. The increase in the number of loading and unloading devices optionally allows more lasers (52) to be used at the same time and allows the marking rate to be accelerated by the machine, even for relatively short marking times. Similarly, the same laser chamber (59) comprising several lasers (52) can optionally be fed by several transfer devices (2) and several loading/unloading devices.

Since in embodiments of the invention the same graphical marking layout is simultaneously performed by at least two graphical marking station, the graphical marking time is approximately the same and dead-time is reduced in the cycle of graphically marking a series of cards and consequently the rate of card processing throughput is increased.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of graphically marking a series of portable objects, each portable object being graphically marked by a plurality of graphical marking procedures, the method comprising:
    receiving a first portable object at a first graphical marking station for graphical marking of a first zone of the first portable object by a first graphical marking means of the first graphical marking station;
    receiving a second portable object at a second graphical marking station for graphical marking of a first zone of the second portable object by a second graphical marking means of the second graphical marking station;
    graphically marking a first marking layout on the first zone of the first portable object by means of the first graphical marking means and simultaneously graphically marking the same first marking layout on the first zone of the second portable object by means of the second graphical marking means;
    transferring the first portable object to the second graphical marking station for graphical marking of a second zone of the first portable object by the second graphical marking means, wherein the second zone is different to the first zone;
    receiving a further portable object at the first graphical marking station for graphical marking of a second zone of the further portable object, by the first graphical marking means of the first graphical marking station;
    graphically marking a second marking layout on the second zone of the first portable object by means of the second graphical marking means, wherein the second marking layout is different to the first marking layout, and simultaneously graphically marking the same second marking layout on the second zone of the further portable object by means of the first graphical marking means;
    wherein the further portable object is subsequently transferred to the second graphical marking station for graphical marking of a first zone of the further portable object, by the second graphical marking means with the first graphical marking layout.

2. A method according to claim 1, wherein the first zone of the corresponding portable object corresponds to at least a portion of a first surface of the said portable object and the second zone corresponds to at least a portion of a second opposing surface of the said portable object, the method further comprising flipping the said portable object after one of the surfaces of the portable object has been graphically marked by the first graphical marking means so that the other opposing surface can be graphically marked by the second graphical marking means.

3. A method according to claim 1, comprising:
    providing the first graphical marking station and the second graphical marking station with a first marking location and a second distinct marking location;
    receiving a portable object from the series of portable objects at the first marking location;
    directing the first graphical marking means to the first marking location; graphically marking the said portable object at the first marking location while simultaneously receiving another portable object, from the series of portable objects, at the second marking location;
    redirecting the first graphical marking means to the second marking location; and graphically marking the other portable object at the second marking location while simultaneously replacing the said portable object at the first marking location with a further portable object from the series of portable objects.

4. A method according to claim 3 wherein the portable object at the first marking location is graphically marked with the first graphical marking layout and subsequently the other portable object at the second marking location is graphically marked with the first graphical marking layout.

5. A method according to claim 1, wherein the first marking station graphically marks at least two sequential portable objects with the first marking layout on the first zone of the respective portable object before graphically marking at least two further sequential portable objects with the second marking layout on the second zone of the respective portable objects.

6. A method according to claim 1, wherein the first marking station graphically marks four sequential portable objects with the first marking layout on the first zone of the respective portable object before graphically marking four further sequential portable objects with the second marking layout on the second zone of the respective portable objects.

7. A graphical marking apparatus for graphically marking a series of portable objects by a plurality of graphical marking procedures carried out sequentially on each of the plurality of portable objects, each portable object having a first zone to be marked with a first graphical marking layout and a second different zone to be marked with a second different graphical marking layout, the apparatus comprising:
- a first marking station comprising first graphical marking means operable to graphically mark the first graphical marking layout or, alternatively, the second graphical marking layout on a portable object of the series of portable objects; and a marking location for receiving the portable object to be marked;
- a second marking station comprising second graphical marking means operable to graphically mark the first graphical marking layout or, alternatively the second graphical marking layout on a portable object; and a marking location for receiving the portable object to be marked;
- a transfer device for transferring a portable object from the first marking station to the second marking station;
- wherein the first marking station is operable to graphically mark the first graphical marking layout on the first zone of a portable object, of the series of portable objects, when said portable object is located at the marking location; and to graphically mark the second graphical marking layout on the second zone of a further portable object of the series of portable objects when said further portable object is located at the marking location;
- wherein the second marking station is operable to graphically mark the second graphical marking layout on the second zone of the said portable object of the series of portable objects when said portable object is located at the marking location; and to graphically mark the first graphical marking layout on the first zone of the said further portable object of the series of portable objects when the said further portable object is located at the marking location
- wherein the first marking station and the second marking station are configured to simultaneously graphically mark the first graphical marking layout on a respective portable object, and to simultaneously graphically mark the second graphical marking layout on a respective portable object.

8. An apparatus according to claim 7 wherein the first zone of the corresponding portable object corresponds to a first surface of the said portable object and the second zone corresponds to a second opposing surface of the said portable object, the apparatus further comprising flip over means for flipping the said portable object after one of the surfaces of the portable object has been graphically marked by the first graphical marking means so that the other opposing surface can be graphically marked by the second graphical marking means.

9. An apparatus according to claim 7, wherein the first marking station and the second marking station each comprises a least two marking locations (52a, 52a', 52a", 52b, 52b', 52b", 54a', 54a", 54b', 54b") for receiving at least two of portable objects to be marked, on the first zone or the second zone, by the respective graphical marking means (52, 52', 52"); and directing means for directing the graphical marking means to one of the at least two marking locations (52a, 52a', 52a", 52b, 52b', 52b", 54a', 54a", 54b', 54b") or alternatively to another of the at least two marking locations (52a, 52a', 52a", 52b, 52b', 52b", 54a', 54a", 54b', 54b").

10. An apparatus according to claim 9, wherein the graphical marking means comprises a laser and the directing means comprises optical means for enabling the beam from the laser to be deflected alternately on to one or other of the marking locations.

11. An apparatus according to claim 9, wherein each marking location is provided with a corresponding transfer path in the marking station for transferring a portable object to the corresponding marking location.

12. A non-transitory computer-readable storage medium storing one or more sequences of instructions which, when loaded into a data-processing device, cause the data-processing device to perform the steps of the method according to claim 1.

13. A method according to claim 1, wherein the portable objects comprise credit cards, telephone cards, identification cards, subscriber identity module cards, or passport booklets.

14. An apparatus according to claim 7, wherein the portable objects comprise credit cards, telephone cards, identification cards, subscriber identity module cards, or passport booklets.

* * * * *